United States Patent
Milillo et al.

(10) Patent No.: US 6,345,338 B1
(45) Date of Patent: *Feb. 5, 2002

(54) ADAPTING RESOURCE USE TO IMPROVE PERFORMANCE IN A CACHING MEMORY SYSTEM

(75) Inventors: Michael Steven Milillo, Louisville; Christopher J. West, Boulder, both of CO (US)

(73) Assignee: Storage Technology Corporation, Louisville, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/723,471

(22) Filed: Nov. 27, 2000

Related U.S. Application Data

(63) Continuation of application No. 09/274,404, filed on Mar. 23, 1999, now Pat. No. 6,185,659.

(51) Int. Cl.[7] .............................................. G06F 12/08
(52) U.S. Cl. ...................... 711/137; 711/113; 711/118; 709/34; 709/39; 709/105
(58) Field of Search ............................... 711/113, 118, 711/137; 709/105, 34, 39

(56) References Cited

U.S. PATENT DOCUMENTS

| | | | |
|---|---|---|---|
| 5,737,747 A | 4/1998 | Vishlitzky et al. | |
| 5,826,107 A | 10/1998 | Cline et al. | |
| 6,023,706 A | 2/2000 | Schmuck et al. | |
| 6,098,064 A | 8/2000 | Pirolli et al. | |
| 6,185,659 B1 * | 2/2001 | Milillo et al. | 711/137 |

* cited by examiner

Primary Examiner—Hiep T. Nguyen
(74) Attorney, Agent, or Firm—Brooks & Kushman P.C.

(57) ABSTRACT

A memory system, and a method for controlling prestaging activities based upon the availability of resources within the memory system. Prestage requests are stored in a shared memory accessible to a resource controller and one or more memory controllers. When the resource controller determines that there are sufficient unused cache memory and sufficient unused memory device back-end bandwidth available to prestage at least one data track, a message is broadcast to all of the memory controllers. Those memory controllers with sufficient unused throughput accept the prestage requests and copy the associated data tracks from the memory devices to the cache memory. Counters are maintained in the shared memory to track the number of prestage requests in the process of being serviced, and the number of prestaged data tracks already buffered in cache memory and waiting to be accessed by an external host.

19 Claims, 2 Drawing Sheets

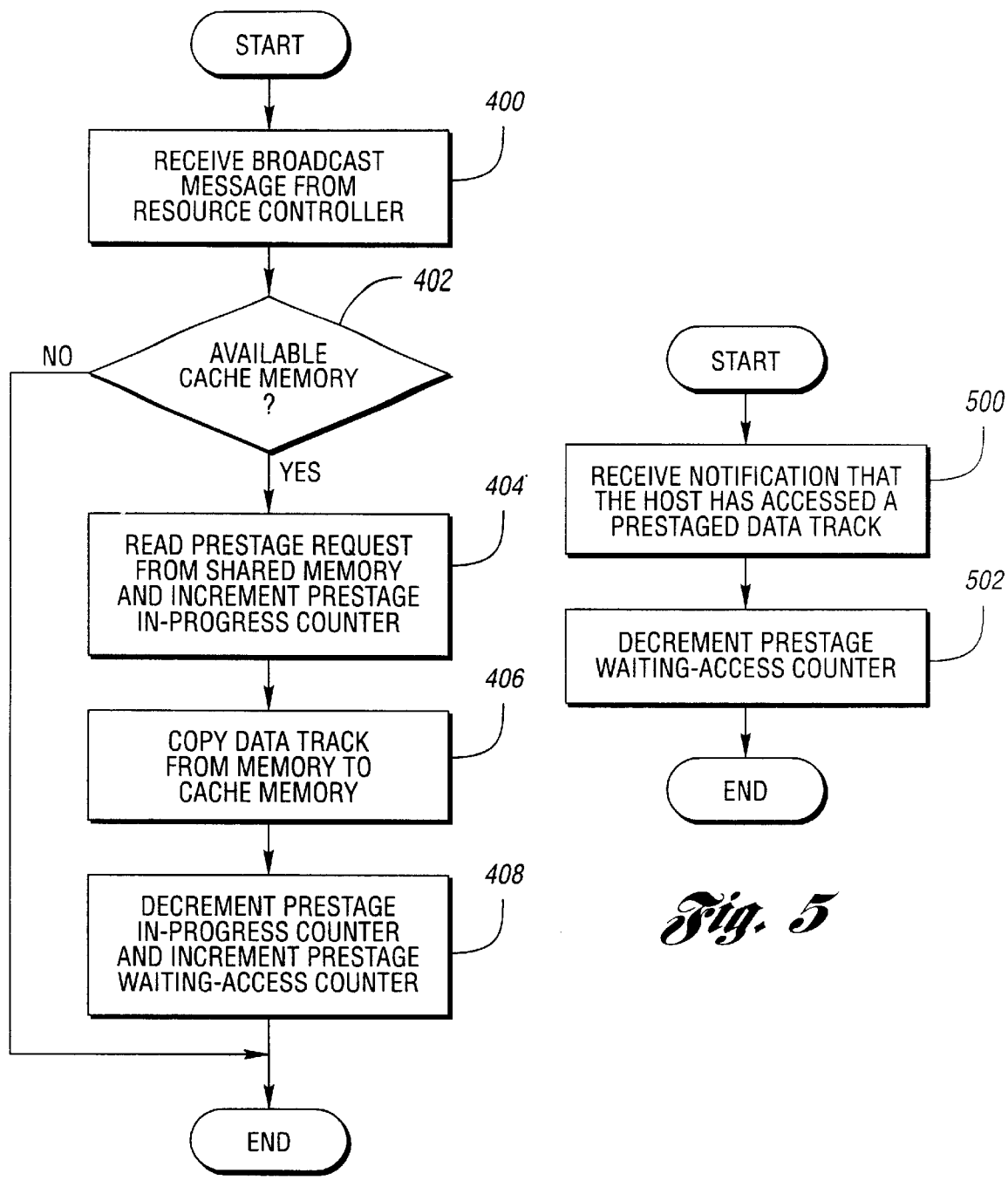

ADAPTING RESOURCE USE TO IMPROVE PERFORMANCE IN A CACHING MEMORY SYSTEM

CROSS-REFERENCE TO RELATED APPLICATIONS

This application is a continuation of U.S. application Ser. No. 09/274,404 filed Mar. 23, 1999, now U.S. Pat. No. 6,185,659, which is incorporated herein in its entirety.

TECHNICAL FIELD

The present invention relates to the field of caching memory devices and methods of controlling data track prestaging based upon resource availability.

BACKGROUND ART

The software controlling a cached disk array system is often unaware of how much work is being done. It is static in determining how much of the system's resources to devote to completing that work. Data is moved between the disk arrays and the cache memory based upon fixed algorithms that do not consider the workload. Consequently, disk array systems do not always use the available cache memory, back-end disk bandwidth, or disk controller processor cycle (throughput) resources to the fullest extent possible.

Static algorithms allocate system resources broadly to allow for many threads of work to operate simultaneously. Each thread being executed is given part of the cache memory with which to work. When a thread issues a request to access data, if that data is currently buffered in the cache memory (a cache hit) it is quickly provided and the thread continues with its work. If the data is not available in the cache memory (a cache miss) then a disk controller must take the request and retrieve the data from a disk drive. Accessing a disk drive consumes controller throughput and the back-end bandwidth of the disk drive array. It also takes considerably more time than accessing the same data from the cache memory.

Under light workload conditions the performance of the disk array system, as seen by the threads requesting access to the data, is governed mainly by the percentage of cache hits and cache misses. A thread that experiences a cache miss is delayed for a limited time as there is little competition for drive controller throughput or disk array bandwidth needed to access the data from the disk array. Competition for the throughput and bandwidth increases as the workload increases. Under heavy workloads, the average access time becomes limited by either the drive controller's ability to service cache misses or the disk array's bandwidth.

Disk array system performance can be improved under all workload conditions by increasing the size of the cache memory, increasing the drive controller throughput, adding more drive controllers, and increasing the back-end bandwidth of the disk array itself. Each of these improvements requires faster hardware which translates to increased cost and power consumption.

Changes to the controlling software cannot increase the speed or capacity of the hardware resources, but it can improve performance by using those resources more efficiently. The best way to improve a caching disk system's performance is to improve its cache utilization. A cache hit is a significant performance improvement over a cache miss. By adjusting the algorithms, underutilized resources can be reallocated to allow more data tracks to be prestaged from the disk array into the cache memory. More data in the cache memory increases the probability of cache hits, and thus improves the overall performance.

DISCLOSURE OF INVENTION

The present invention is a memory system, and a method for controlling prestaging of data tracks to cache memory based upon the availability of resources within the memory system. The memory system comprises a cache memory, a resource controller, a shared memory, one or more memory devices, and one or more memory controllers. Prestage hints from an external host are provided to the resource controller that generates and stores prestage requests in the shared memory. The contents of the shared memory are also available to the memory controllers. When the resource controller determines that there is sufficient cache memory and sufficient memory device back-end bandwidth available to prestage at least one data track, it broadcasts a message to all of the memory controllers. Memory controllers not utilizing all of their throughput may accept the prestage requests from the shared memory then copy the associated data tracks from the memory devices to the cache memory. Counters are maintained in the shared memory to track the number of prestage requests in the process of being serviced, and the number of prestaged data tracks already buffered in cache memory and waiting to be accessed by the host.

This system and method provide improved performance during simple benchmark testing and during periods of low workload. The improved performance is achieved by increasing the use of cache memory, memory device back-end bandwidth, and memory controller throughput to increase the probability of a cache hit.

Accordingly, it is an object of the present invention to provide a memory system that has at least one memory device, at least one memory controller, cache memory and a resource controller. The resource controller determines when there is sufficient unused cache memory and/or unused memory device bandwidth available to service at least one prestage request. When either or both resources are available, the resource controller broadcasts a message to all of the memory controllers to service the prestage requests. Each memory controller with available throughput accepts one prestage request and then copies the associated data track from the memory devices to the cache memory.

Yet another object of the present invention is to provide a method for controlling prestaging requests in a caching memory system. The method involves calculating the available capacity of the cache memory and calculating the available bandwidth for the memory devices. When the calculated available capacity and/or bandwidth allow for at least one data track to be prestaged, a message is broadcast to all of the memory controllers in the system. When each memory controller receives the broadcast message, it determines its available throughput. When the throughput is sufficient to service at least one prestage request, the memory controller accepts one prestage request and then copies the associated data track from the memory devices to the cache memory.

These and other objects, features and advantages will be readily apparent upon consideration of the following detailed description in conjunction with the accompanying drawings.

BRIEF DESCRIPTION OF DRAWINGS

FIG. 4 is a flow diagram of the process for accepting a prestage request; and FIG. 5 is a flow diagram of the process for accessing prestaged data tracks.

BEST MODE FOR CARRYING OUT THE INVENTION

The present invention is a memory system, and a method for controlling prestage requests based upon resource availability within the system. The resources monitored are cache memory usage, memory device back-end bandwidth, and memory controller throughput. When there is sufficient cache memory, memory device bandwidth, and memory controller throughput available, then one or more data tracks identified by the one or more prestage requests are copied from the memory devices to the cache memory.

Figure 1:
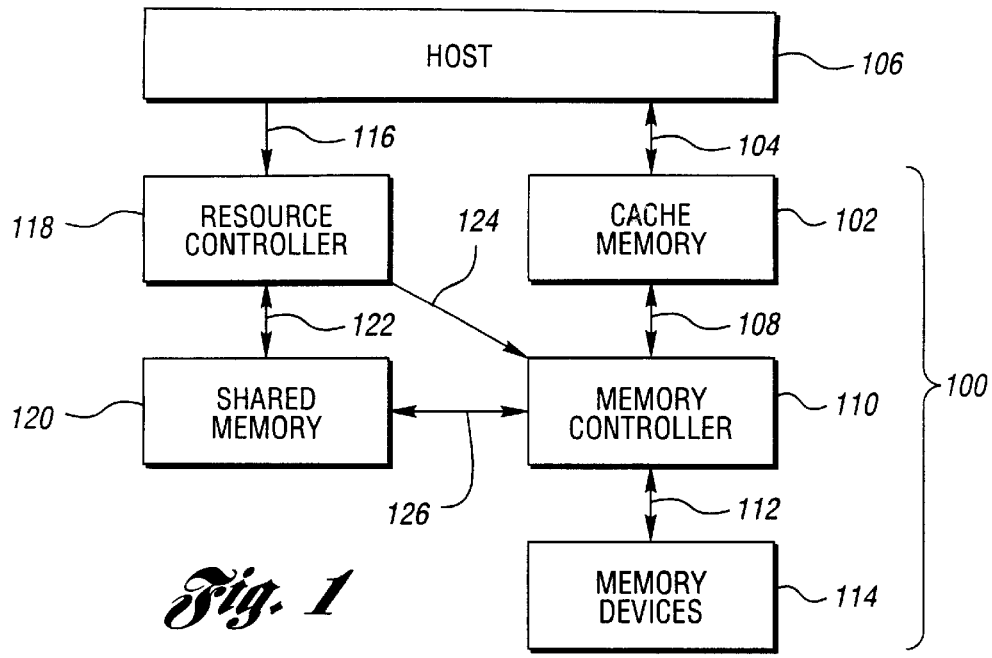
FIG. 1 is a block diagram of the present invention.

FIG. 1 is a block diagram of a memory system 100 that implements the present invention. A cache memory 102 provides a high speed interface 104 to a host 106 for rapid exchanges of data. Data written from the host 106 into the cache memory 102 is copied through a second interface 108 by one or more memory controllers 110. Memory controllers 110 write the data across a bus 112 into one or more memory devices 114. This process is referred to as a destaging activity. It allows the host to write data at high speeds into the memory system 100 without waiting for the propagation delays introduced by the memory controllers 110, bus 112, or memory devices 114.

The speed at which data can be supplied to the host 106 on demand is determined by presence or absence of that data in the cache memory 102. When the data is present in the cache memory 102, it is read quickly by the host 106 over the high speed interface 104. When the data is not present in the cache memory, one of the memory controllers 110 must copy the requested data from the proper data track in the proper memory device 114 into the cache memory 102. Once the requested data is in cache memory 102, it is supplied to the host 106 across the high speed interface 104. Copying the data from the memory devices 114 to the cache memory 102 after host 106 has attempted to read the data is referred to as a demand stage request.

To improve the probability that the desired data is available in the cache memory 102 for the host 106 to read, the host 106 issues prestage hints on interface 116 to the memory system 100 to have the data copied into the cache memory 102 before the host 106 attempts a read. The present invention provides a resource controller 118 to generate and store the prestage requests in a shared memory 120 through interface 122.

Resource controller 118 reads the contents of shared memory 120 when determining if there are sufficient resources available to service the prestage requests. When the resource controller 118 determines that at least one prestage request can be serviced, it broadcasts a message over interface 124 to memory controllers 110. This message instructs the memory controllers 110 to examine the contents of the shared memory 120 for prestage requests. Each memory controller 110 that has available throughput accepts one of the unaccepted prestage requests from shared memory 120 over interface 126. The accepting memory controller 110 then copies the data track associated with the accepted prestage request from one of the memory devices 114 to cache memory 102. Statuses of the prestage request activities are stored in shared memory 120 in the form of a prestage in-progress counter and a prestage waiting-access counter. These two counters are used by the resource controller 118 when determining resource availability.

A variety of technologies and configurations can be used in the present invention for memory devices 114, memory controllers 110, and resource controller 118. Memory technologies may include disk drives, tape drives, solid state memory devices, virtual storage managers and the like. Configuration of memory devices 114 may range from a single drive to large redundant arrays. Similarly, one or more memory controllers 110 may be employed between the memory devices 114 and cache memory 102. The preferred embodiment utilizes multiple memory controllers with an array of hard disk drives. Resource controller 118 may be software or firmware executed by a dedicated processor, executed by any other processor in the memory system 100, or it may be hardwired logic.

Figure 2:
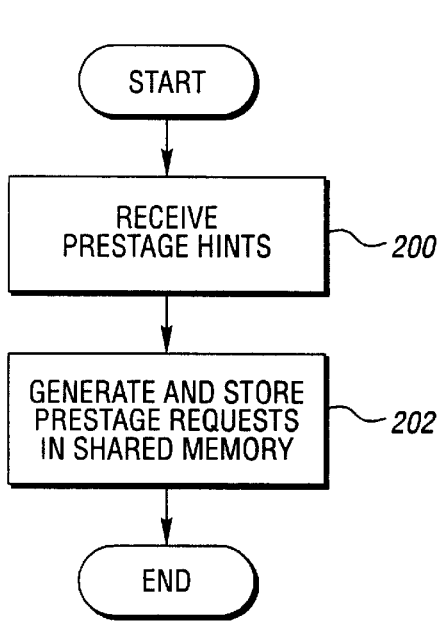
FIG. 2 is a flow diagram of the process for storing prestage requests in shared memory.

FIG. 2 is a flow diagram of the process executed by the resource controller 118 to store the prestage requests in shared memory 120. This function is initiated when resource controller 118 receives one or more prestage hints from host 106, as shown in block 200. Resource controller 118 writes the prestage requests generated into shared memory 120, as shown in block 202. FIG. 2 shows this function as event driven, with the starting event being the arrival of the prestage hints. Alternatively, this function may be periodic in nature with the resource controller 118 generating the new prestage requests at a fixed rate. Other methods of communication may also be used in transferring the prestage requests to shared memory 120.

Figure 3:
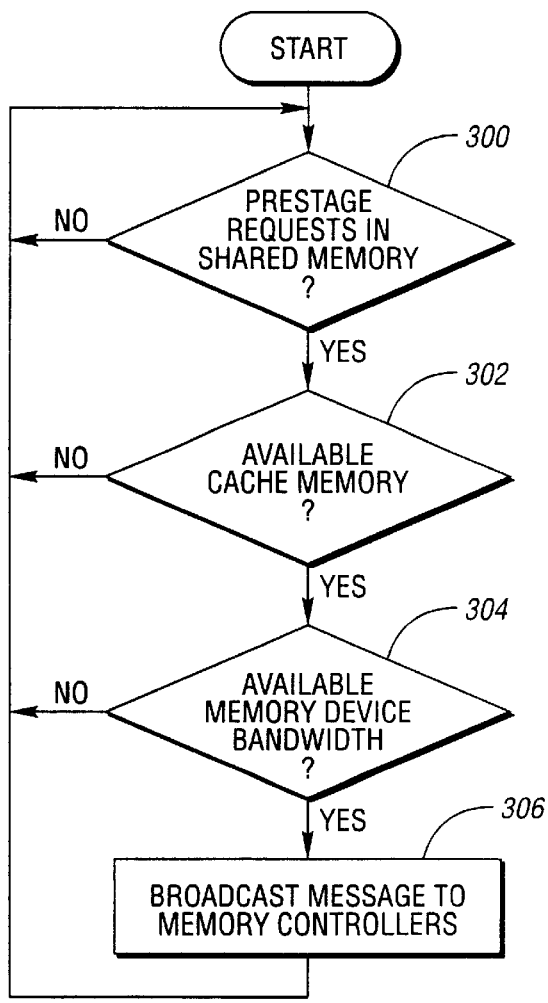
FIG. 3 is a flow diagram of the process for determining when to broadcast the message to the memory controllers.

FIG. 3 is a flow diagram of the decisions that resource controller 118 must make before broadcasting a message to memory controllers 110. The first decision made by the resource controller 118 is to determine, decision block 300, if there are any prestage requests in shared memory 120 that have not yet been accepted by any memory controller 110. If there are no prestage requests in shared memory 120 to service then resource controller 118 rechecks the shared memory 120 periodically, or waits for new prestage requests to be generated.

When at least one prestage request is in shared memory 120, then the available cache memory 102 is calculated to determine if there is sufficient room to buffer at least one data track from one of the memory devices 114, as shown by decision block 302. Cache memory availability is determined by the total capacity of cache memory 102 installed in the memory system 100, a portion of that total capacity allocated to prestage and demand stage activities (allocated capacity), a percentage of the allocated capacity reserved for prestage activities, the amount already consumed by prestaged data tracks waiting for access by the host 106, the amount being consumed by data tracks in the process of being prestaged, and by a cache free space threshold. Cache free space threshold defines the maximum amount of cache memory 102 that is required to buffer one data track from the memory devices 114. The product of the cache free space threshold and the prestage inprogress counter is the amount of cache memory 102 allocated to prestage requests in-progress. The product of the cache free space threshold and the prestage waiting-access counter is the amount of cache memory 102 consumed by prestaged data tracks waiting to be accessed by host 106. When the percentage of the allocated capacity reserved for prestage activities, minus the memory consumed by prestage waiting-access data tracks, and minus the memory allocated to prestage in-progress data tracks is greater than or equal to the cache free space threshold, then there is sufficient cache memory 102 available to service at least one more prestage request.

The allocated capacity of cache memory 102 varies from memory system to memory system 100 depending upon the users requirements and budget. This allocated capacity may either be embedded within the resource controller 118, or supplied to the resource controller 118 from an external source, usually host 106. In the preferred approach, resource controller 118 is designed to accept the allocated capacity from an external source. This allows the resource controller 118 to be installed in a variety of memory systems 100 without a need for customization to each memory system 100.

The percentage of the allocated capacity of cache memory 102 reserved for prestage activities may either be a fixed or dynamic value. Fixed values are suitable for situations where there is sufficient allocated capacity to handle all anticipated prestage workloads. Around 50% of the allocated capacity is reserved for prestage activities in typical applications. Higher or lower percentages may be suitable where the expected ratio of all activities to prestage activities is other than two-to-one.

In the preferred approach, the percentage of the allocated capacity reserved for prestaging activities is a dynamic variable to improve overall memory system 100 performance. During periods where the number of demand stage requests are low, a higher percentage of the allocated capacity is reserved for prestage activities. More prestaged data tracks in cache memory 102 increases the probability of a cache hit. During periods of high demand stage requests, the percentage reserved for prestage activities is decreased accordingly. Dynamic reservation of allocated capacity should also take into account a maximum expected demand stage burst rate. If all of the allocated capacity not used by demand stage requests is reserved for and consumed by prestage requests, then additional demand stage requests cause a contention. In such situations, the memory system 100 must either delay servicing the additional demand stage requests, or dump prestaged data tracks in-progress and/or waiting-access to make room for the demand stage data tracks. Delaying demand stage requests lowers performance. Prestaging data tracks and then deleting them before they are accessed by host 106 wastes resources. Reserving part of the unused allocated capacity for demand stage request bursts minimizes or eliminates the contention.

Resource controller 118 also checks the available back-end bandwidth of the memory devices 114, as shown by decision block 304, for sufficient bandwidth to read at least one additional data track. Bandwidth availability is a function of the total memory device bandwidth, a portion of the total memory device bandwidth allocated to servicing prestage requests, demand requests and destage requests (allocated bandwidth), a percentage of the allocated bandwidth reserved for prestage activities, the bandwidth currently consumed by prestage requests in-progress, and the bandwidth required to read one data track. The product of the bandwidth required to read one data track and the prestage in-progress counter is the amount of bandwidth currently consumed by the prestage requests in-progress. When the percentage of the memory device allocated bandwidth reserved for servicing prestage activities, minus the bandwidth currently consumed by prestage requests in-progress is greater than or equal to the bandwidth required to read one data track, then there is sufficient memory device bandwidth available to service at least one additional prestage request.

Allocated memory device bandwidth, like the allocated capacity of cache memory 102, varies from memory system to memory system 100. The allocated bandwidth may either be embedded within the resource controller 118, or supplied to the resource controller 118 from an external source, usually host 106. Here too, the preferred approach is to design resource controller 118 to accept the allocated bandwidth from an external source. This allows the resource controller 118 to be installed in a variety of memory systems 100 without a need for customization.

The percentage of memory device allocated bandwidth reserved for servicing prestage activities may either be a fixed or dynamic value. Fixed values are suitable for situations where there is sufficient allocated bandwidth to handle all anticipated prestage workloads. Around 20% to 80% of the allocated bandwidth may be reserved for prestage requests, with 50% being a nominal value. The remaining allocated bandwidth is reserved for demand stage and destage activities. In some applications, no allocated bandwidth reservations are made for the various activities. Prestage, demand stage and destage activities share all of the allocated bandwidth. Finally, in still other applications, the allocated bandwidth is the total bandwidth.

Where a percentage of the memory device allocated bandwidth is reserved for servicing prestage requests, it is preferential to adjust that percentage dynamically. The adjustment takes into account the allocated bandwidth consumed by active demand stage requests and active destage requests. During times of low demand stage and destage activities the percentage of allocated bandwidth reserved for prestage activities is increased. During times of higher demand stage and destage activities the percentage is decreased. As with dynamic cache memory allocation, dynamic bandwidth allocation should also take into account the maximum expected demand stage burst rate. This will help minimize or eliminate delays to demand stage requests caused by overloading the allocated bandwidth of the memory devices 114.

When the resource controller 118 determines that unaccepted prestage requests are waiting in shared memory 120, sufficient allocated capacity of the cache memory 102 is available, and sufficient memory device allocated bandwidth is available, it broadcasts a message to the memory controllers 110, as shown in block 306. This message informs the memory controllers 110 that there is work to be performed. Using this approach, memory controllers 110 are not required to consume any of their processor time to periodically check shared memory 120 for prestage requests.

In alternative arrangements, the sequence of decisions made by the resource controller 118 may be changed. For example, the memory device allocated bandwidth availability may be checked first, the presence of unaccepted prestage requests in shared memory 120 checked second, and cache memory allocated capacity availability checked third. In still other arrangements, resource controller 118 may only check for allocated capacity availability or allocated bandwidth availability, but not both. For example, the resource controller 118 may only check for unaccepted prestage requests and allocated capacity availability before broadcasting the message to the memory controllers 110. It would then be up to each memory controller 110 that accepts a prestage request from shared memory 120 to arbitrate with the other memory controllers 110 for memory device bandwidth.

FIG. 4 is a flow diagram of the process executed by the memory controllers 110 responding to the broadcast message. This function starts with the receipt of the broadcast message, as shown in block 400. Each memory controller 110 then determines if it has the available throughput (the unused portion of its total throughput) necessary to service one prestage request, as shown by decision block 402. If a memory controller 110 is busy, then it ignores the broadcast message. A memory controller 110 that has the time, accepts one of the unaccepted prestage requests from the shared memory 120 and increments the prestage in-progress counter, as shown in block 404. Incrementing the prestage in-progress counter informs the resource controller 118 that part of cache memory 102 and memory device bandwidth is being consumed by one more in-progress prestage activity. After a memory controller 110 has accepted a prestage request, it copies the data track associated with that prestage request from the appropriate memory device 114 to cache memory 102, as shown in block 406. When the data track has been copied, the memory controller 110 decrements the prestage in-progress counter and increments the prestage waiting-access counter in shared memory 120, as shown in block 408. The functions of block 408 inform the resource controller 118 that the memory device bandwidth consumed by the in-progress prestage activity is free, and the prestaged data track is buffered in the cache memory 102 waiting to be accessed by host 106.

FIG. 5 is a flow diagram of the procedure executed by the resource controller 118 responding to the host 106 accessing a prestaged data track This function starts when the resource controller receives notification that host 106 accesses a prestaged data track from cache memory 102, as shown in block 500. Resource controller 118 then decrements the prestage waiting-access counter in shared memory 120, as indicated by block 502. At this point, the cache memory 102 partially emptied by the just accessed data track is now available to buffer another data track.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A memory system for use by a host generating prestage hints, the memory system comprising:

at least one memory device;

a cache memory in communication with the host;

a resource controller generating prestage requests based on prestage hints received from the host, the resource controller broadcasting a prestage request if cache memory space is available to service the request; and at least one memory controller in communication with the at least one memory device, the cache memory and the host, each memory controller transferring data between the cache memory and at least one memory device based on a received prestage request and on available memory controller throughput.

2. A memory system for use by a host as in claim 1 wherein broadcasting a prestage request comprises storing a message in a shared memory accessible by the resource controller and the at least one memory controller.

3. A memory system for use by a host as in claim 1 wherein the at least one memory device comprises a plurality of data tracks, each prestage request identifying at least one of the plurality of data tracks.

4. A memory system for use by a host as in claim 3 further comprising an in-progress counter indicating how many respective data tracks of the plurality of data tracks are in the process of being copied into the cache memory.

5. A memory system for use by a host as in claim 3 further comprising a waiting-access counter indicating how many respective data tracks of the plurality of data tracks are buffered by the cache memory and are waiting to be accessed by the host.

6. A memory system for use by a host as in claim 3 wherein the resource controller calculates the available capacity of the cache memory based on the number of data tracks buffered by the cache memory waiting to be accessed by the host and on the number of data tracks in the process of being copied into the cache memory.

7. A memory system for use by a host generating prestage hints, the memory system comprising:

at least one memory device;

a cache memory in communication with the host;

a resource controller generating prestage requests based on prestage hints received from the host, the resource controller broadcasting a prestage request if memory device bandwidth is available to service the request; and at least one memory controller in communication with the at least one memory device, the cache memory and the host, each memory controller transferring data between the cache memory and at least one memory device based on a received prestage request and on available memory controller throughput.

8. A memory system for use by a host as in claim 7 wherein broadcasting a prestage request comprises storing a message in a shared memory accessible by the resource controller and the at least one memory controller.

9. A memory system for use by a host as in claim 7 wherein the at least one memory device comprises a plurality of data tracks, each prestage request identifying at least one of the plurality of data tracks.

10. A memory system for use by a host as in claim 7 wherein the resource controller calculates available memory device bandwidth based on the number of data tracks in the process of being copied into the cache memory.

11. A method of prestaging data in a memory system having at least one memory device, a cache memory and at least one memory controller transferring data between the each memory device and the cache memory, the method comprising:

generating a plurality of prestage requests;

measuring at least one memory system resource;

broadcasting a message to each memory controller based on the measured memory system resource and on having at least one unaccepted prestage request;

determining an available throughput for each memory controller;

accepting at least one unaccepted prestage request in at least one memory controller having available throughput sufficient to service the accepted prestage request; and transferring data between the at least one memory device and the cache memory to service the accepted prestage request.

12. A method of prestaging data in a memory system as in claim 11 wherein measuring at least one memory system resource comprises calculating an available bandwidth of the at least one memory device.

13. A method of prestaging data in a memory system as in claim 11 wherein measuring at least one memory system resource comprises calculating an available capacity of the cache memory.

14. A method of prestaging data in a memory system as in claim 11 wherein data is stored in a plurality of data tracks in at least one memory device.

15. A method of prestaging data in a memory system as in claim 11 wherein broadcasting a message comprises writing the message to shared memory.

16. A method of prestaging data in a memory system as in claim 11 further comprising:
   incrementing an in-progress counter in response to reading each accepted prestage request;
   incrementing a waiting-access counter and decrementing the in-progress counter in response to transferred data; and
   decrementing the waiting-access counter in response to data buffered by the cache memory that is accessed by the host.

17. A method of prestaging data in a memory system as in claim 16 wherein the in-progress counter and the waiting-access counter are held in shared memory.

18. A method of prestaging data in a memory system as in claim 16 further comprising calculating an available capacity of the cache memory based on the in-progress counter and the waiting-access counter.

19. A method of prestaging data in a memory system as in claim 16 further comprising calculating an available bandwidth of the at least one memory device based on the in-progress counter.

* * * * *